United States Patent [19]

Ohara

[11] Patent Number: 5,426,461
[45] Date of Patent: Jun. 20, 1995

[54] IMAGE PICKUP SIGNAL PROCESSING APPARATUS FOR PERFORMING NONLINEAR PROCESSING

[75] Inventor: Eiji Ohara, Kawasaki, Japan

[73] Assignee: Canon Kabushiki Kaisha, Tokyo, Japan

[21] Appl. No.: 94,923

[22] Filed: Jul. 22, 1993

Related U.S. Application Data

[63] Continuation of Ser. No. 618,989, Nov. 28, 1990, abandoned.

[30] Foreign Application Priority Data

Nov. 29, 1989 [JP] Japan .................. 1-307429

[51] Int. Cl.⁶ ............................................. H04N 5/202
[52] U.S. Cl. ..................... 348/254; 348/223; 348/255
[58] Field of Search ............... 358/160, 164, 132, 171, 358/172, 174; 341/138, 139, 140, 155, 159; 348/228, 223, 254, 255; H04N 5/202

[56] References Cited

U.S. PATENT DOCUMENTS

| | | | |
|---|---|---|---|
| 3,735,393 | 5/1973 | Carbrey | 341/139 X |
| 4,000,366 | 12/1976 | Sirrine | 358/164 X |
| 4,403,253 | 9/1983 | Morris et al. | 348/572 |
| 4,578,715 | 3/1986 | Yamaguchi | 358/457 X |
| 4,589,034 | 5/1986 | Yokomizo | 341/155 X |
| 4,625,240 | 11/1986 | Yablonski et al. | 341/139 X |
| 4,642,694 | 2/1987 | Yamagishi et al. | 341/155 X |
| 4,771,267 | 9/1988 | Russell, Jr. et al. | 341/155 X |
| 4,774,579 | 9/1988 | Kacheran et al. | 358/96 X |
| 4,831,378 | 5/1989 | Baars et al. | 348/572 X |
| 4,841,301 | 6/1989 | Ichihara | 341/139 X |
| 4,875,045 | 10/1989 | Lynch et al. | 341/139 |
| 4,875,049 | 10/1989 | Yoshida | 341/139 X |
| 4,882,584 | 11/1989 | Nakamura et al. | 341/139 |
| 4,918,450 | 4/1990 | Sugiyama et al. | 348/572 X |
| 4,980,768 | 12/1990 | Stehle et al. | 358/171 X |

FOREIGN PATENT DOCUMENTS

83865 7/1983 European Pat. Off.
0092171 4/1988 Japan .................. H04N 5/202

Primary Examiner—Victor R. Kostak
Attorney, Agent, or Firm—Fitzpatrick, Cella, Harper & Scinto

[57] ABSTRACT

An image pickup signal processing apparatus includes an A/D converter and a nonlinear signal processing circuit for comparing an image pickup signal input to the A/D converter and a voltage obtained by dividing a reference voltage of the A/D converter and nonlinearly processing the image pickup signal. The nonlinear signal processing circuit includes a negative feedback amplifier and circuit components for changing the amount of negative feedback provided by the negative feedback amplifier to generate nonlinear characteristics.

22 Claims, 5 Drawing Sheets

IMAGE PICKUP SIGNAL PROCESSING APPARATUS FOR PERFORMING NONLINEAR PROCESSING

This application is a continuation of U.S. application Ser. No. 07/618,989 filed Nov. 28, 1990, now abandoned.

BACKGROUND OF THE INVENTION

1. Field of the Invention

The present invention relates to an image pickup signal processing apparatus for performing nonlinear processing such as λ-correction and white compression processing.

2. Related Background Art

Figure 4:
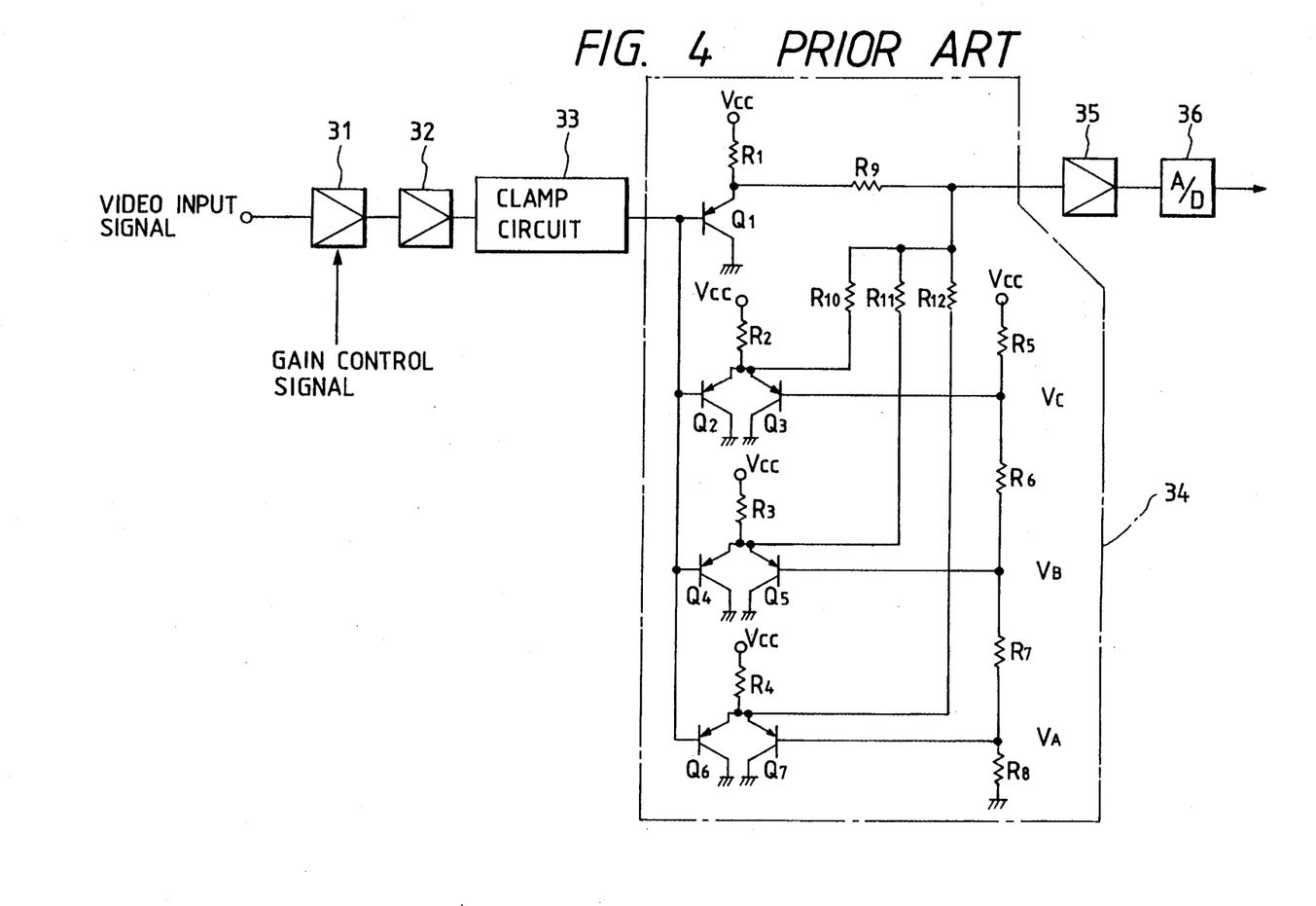
FIG. 4 is a circuit diagram showing a conventional apparatus.

A conventional apparatus of this type is known and used in a variety of applications. Of these conventional applications, an apparatus having good frequency characteristics in nonlinear processing is shown in FIG. 4.

This processing apparatus comprises a VCA (Voltage-Controlled Amplifier) 31, amplifiers 32 and 35, a clamp circuit 33, a nonlinear processor 34, and an A/D (analog/digital) converter 36. The nonlinear processor 34 includes pnp transistors $Q_1$ to $Q_7$ and resistors $R_1$ to $R_{12}$.

An operation of this processing apparatus will be described below.

A video input signal is amplified to an optimal signal level by the VCA 31 controlled by a gain control signal. The VCA 31 is arranged to correct the white balance. The level-controlled gain control signal is input to and amplified by the amplifier 32. The amplified signal is input to the clamp circuit 33, and the black level of the video signal is fixed to a predetermined potential. The clamped video signal is input to a buffer amplifier and a differential switch in the nonlinear processor 34. The buffer amplifier is constituted by the transistor $Q_1$ and the resistor $R_1$. The differential switch is constituted by a set of the transistors $Q_2$ and $Q_3$ and the resistor $R_2$, a set of the transistors $Q_4$ and $Q_5$ and the resistor $R_3$, and a set of the transistors $Q_6$ and $Q_7$ and the resistor $R_4$. The bases of the transistors $Q_3$, $Q_5$, and $Q_7$ receive reference voltages $V_A$, $V_B$, and $V_C$ obtained by dividing a power source voltage $V_{CC}$ through the resistors $R_5$ to $R_8$. A clamp voltage $V_{CP}$ and the above voltages $V_A$, $V_B$, $V_C$, and $V_{CC}$ satisfy the condition $V_{CP} < V_A < V_B < V_C < V_{CC}$.

When the voltage of the video signal falls within the range between the voltages $V_A$ and $V_B$, the transistors $Q_2$, $Q_4$, and $Q_7$ are turned on, and the transistors $Q_3$, $Q_5$, and $Q_6$ turned off. The level of the video signal input is attenuated to $R_{12}/(R_9//R_{10}//R_{11}+R_{12})$ (where // represents a resistance of parallel-connected resistors) by the resistors $R_9$ to $R_{11}$.

When the voltage of the video signal falls within the range between the voltages $V_{CP}$ and $V_A$, the level of the input video signal is attenuated to 1. When the voltage of the video signal falls within the range of the voltages $V_B$ and $V_C$, the level of the input video signal is attenuated to $(R_{11}//R_{12})/(R_9//R_{10}+R_{11}//R_{12})$. When the voltage of the video signal is $V_C$ or more, its level is attenuated to $(R_{10}//R_{11}//R_{12})/(R_9R_{10}//R_{11}//R_{12})$. When the resistances of the resistors $R_9$ to $R_{12}$ are appropriately set, nonlinear processing such as λ-correction shown in FIG. 5 and white compression processing is performed in accordance with the nonlinear regression approximation.

The level of the nonlinearly processed video signal is amplified by the amplifier 35 into an optimal input level of the A/D converter 36. For example, the amplified signal is subjected to digital signal processing (not shown).

Figure 5:
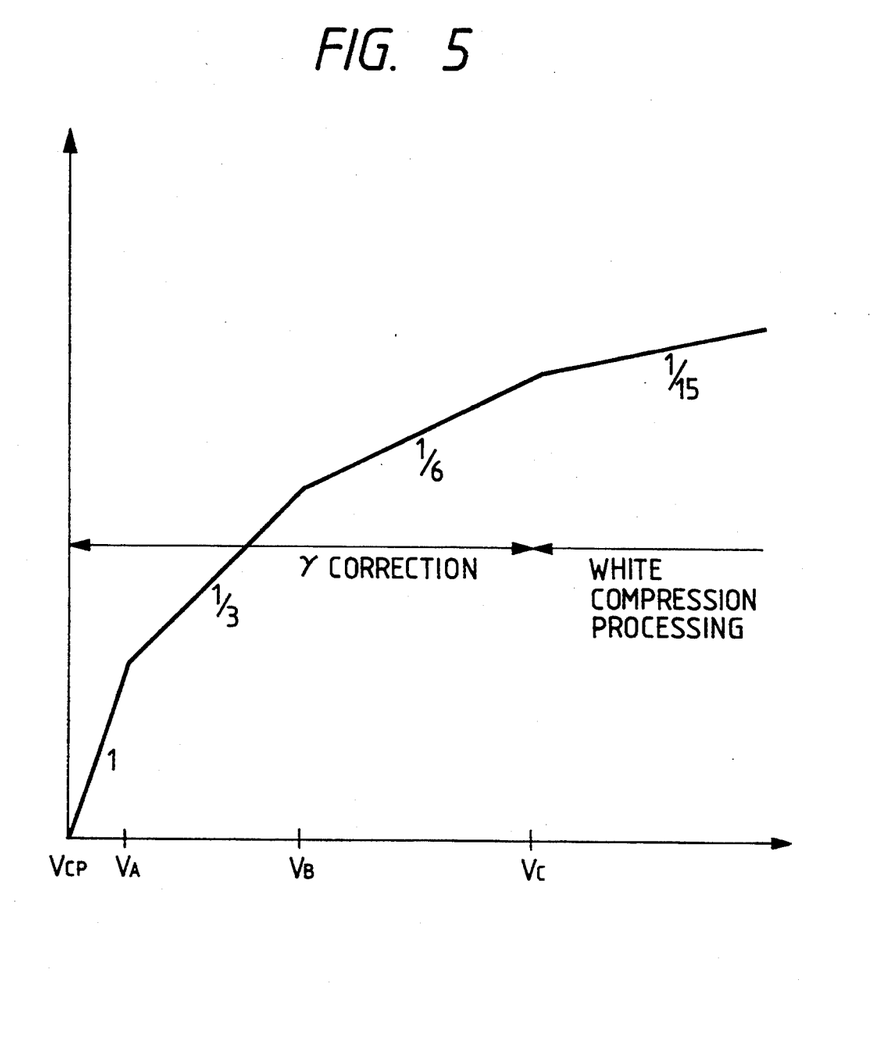
FIG. 5 is a graph showing nonlinear characteristics of λ correction and white compression processing.

In this conventional processing apparatus, however, (a) when the voltages $V_{CP}$, $V_A$, $V_B$, and $V_C$ in FIG. 5 are close to each other, the response characteristics of the differential switch or variations in the reference voltages $V_A$, $V_B$, and $V_C$ which are caused by variations in resistances of the resistors $R_5$ to $R_8$ become nonnegligible, and good nonlinear characteristics cannot be obtained at points of changes in regression approximation characteristics.

(b) In order to prevent the above drawback, the video signal is sufficiently amplified by the amplifier 32 to increase differences between the reference voltages. In this case, since the video signal in image pickup signal processing has a magnitude which is several times that of a normal television signal, the dynamic range of the amplifier 32 becomes insufficient.

(c) In the conventional apparatus, since nonlinear processing has attenuation characteristics, the video signal must match the input level of the A/D converter 36, which requires a relatively large amplitude. The circuit size is undesirably increased as a result.

In the conventional apparatus, gain control processing such as white balancing of the video input signal is performed by the VCA 31. In order to improve the frequency characteristics of the VCA 31 and to simplify its circuit arrangement, reference potentials across a ladder resistor circuit in the A/D converter 36 are changed to variably control the gain of the A/D converter 36, thereby performing gain control processing.

(d) In this case, nonlinear processing must be performed prior to gain control processing such as white balancing. In the conventional processing apparatus, however, since the nonlinear characteristics are fixed, the above arrangement cannot be realized, resulting in inconvenience.

SUMMARY OF THE INVENTION

The present invention has been made to solve these problems and to provide an image pickup signal processing apparatus having good nonlinear characteristics.

In order to achieve the above object of the present invention, the image pickup signal processing apparatus according to embodiments of the present invention is arranged as follows:

(1) An image pickup signal processing apparatus comprising an A/D converter, and a nonlinear signal processing means for comparing an image pickup signal input to the A/D converter with a potential obtained by voltage-dividing a reference voltage of the A/D converter and nonlinearly processing the image pickup signal;

(2) An image pickup signal processing apparatus as in (1) above, wherein the nonlinear signal processing means comprises a negative feedback amplifier, and a negative feedback amount of the negative feedback amplifier is changed to generate nonlinear characteristics;

(3) An image pickup signal processing apparatus as in (1) above, wherein the reference voltage of the A/D converter is changed to use the A/D converter also as a voltage-controlled amplifier; and (4) An image pickup signal processing apparatus as in (1) above, wherein the nonlinear signal processing means fixes the black level of the image pickup signal to a predetermined potential.

According to the arrangements (1) to (4) described above, the video signal having a large amplitude and serving as an input to the A/D converter is compared with the potential obtained by dividing the reference voltage of the A/D converter, and nonlinear processing of the video signal is performed based on the result of comparison.

In the arrangement (2), the nonlinear characteristics are generated by the negative feedback amount of the negative feedback amplifier. In the arrangement (3), the A/D converter also serves as the voltage-controlled amplifier. In the arrangement (4), the black level of the image pickup signal is fixed by the nonlinear signal processing means.

DETAILED DESCRIPTION OF THE PREFERRED EMBODIMENTS

The present invention will be described in detail with reference to the preferred embodiments.

Figure 1:
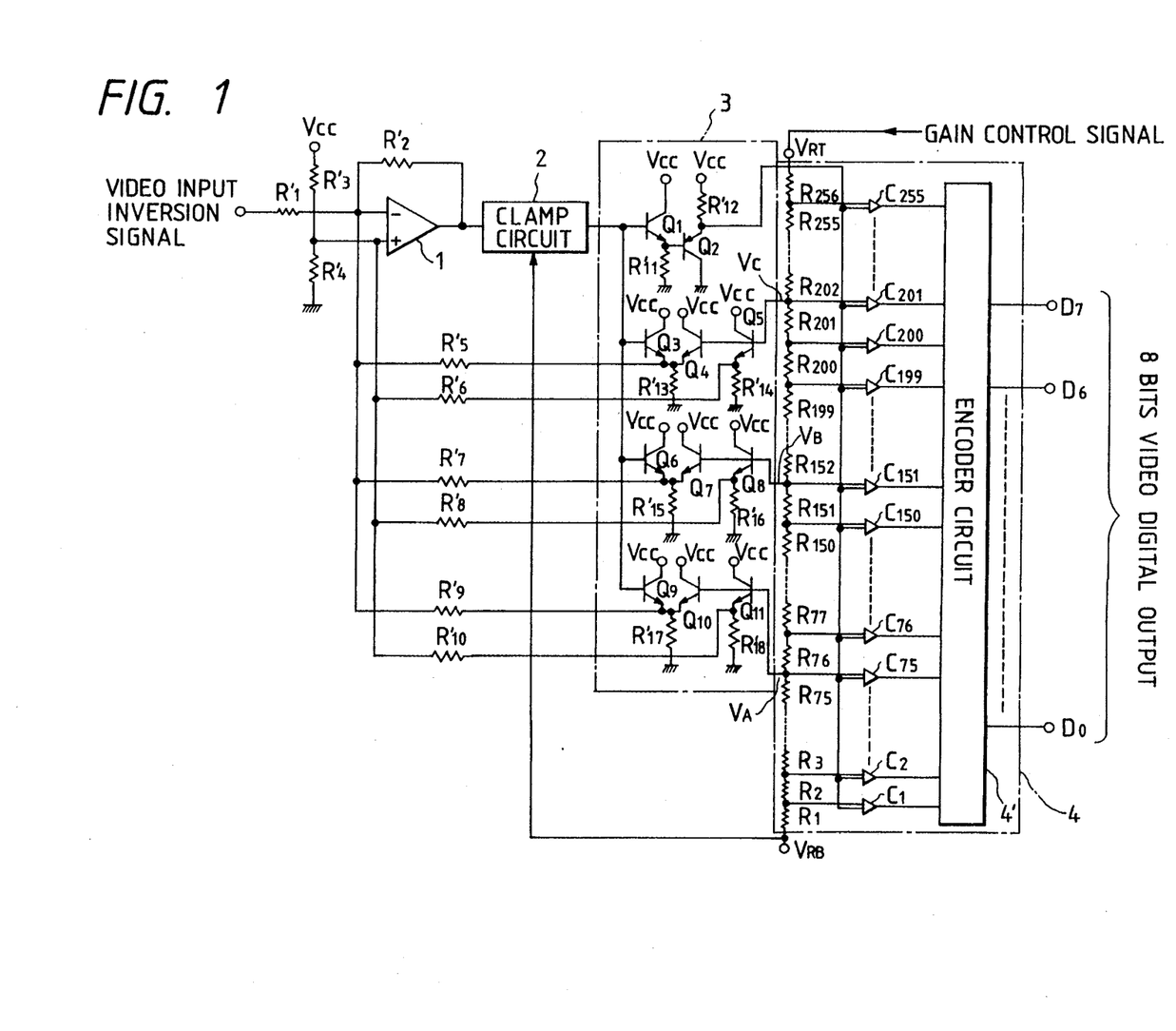
FIG. 1 is a circuit diagram of the first embodiment according to the present invention.

FIG. 1 is a circuit diagram of an image pickup signal processing apparatus according to an embodiment of the present invention. The processing apparatus comprises a negative feedback amplifier 1, a clamp circuit 2, a buffer amplifier/differential switch unit 3, and a parallel comparison-type 8-bit A/D converter 4. The buffer amplifier/differential switch unit 3 is constituted by resistors $R'_1$ to $R'_{18}$ and transistors $Q_1$ to $Q_{11}$. The A/D converter 4 comprises ladder resistors $R_1$ to $R_{256}$, comparators $C_1$ to $C_{255}$, and an encoder circuit 4'.

An operation of the image pickup signal processing apparatus will be described below. A video input inversion signal is inverted and amplified by the negative feedback amplifier 1. The resistors $R'_1$ and $R'_2$ serve as input and feedback resistors for the amplifier 1, respectively. The resistors $R'_3$ and $R'_4$ serve as resistors for setting a DC level of the amplifier 1. The amplified video signal is input to the clamp circuit 2. A lower reference voltage $V_{RB}$ for the A/D converter 4 is also input to the clamp circuit 2 to fix the black level of the video signal to $V_{RB}$.

The clamped video signal is input to the buffer amplifier consisting of the transistors $Q_1$ and $Q_2$ and the resistors $R'_{11}$ and $R'_{12}$, and the differential switch constituted by a set of the transistors $Q_3$ and $Q_4$ and the resistor $R'_{13}$, a set of the transistors $Q_6$ and $Q_7$ and the resistor $R'_{15}$, and a set of the transistors $Q_9$ and $Q_{10}$ and the resistor $R'_{17}$. The bases of the transistors $Q_4$, $Q_7$, and $Q_{10}$ in the differential switch receive voltages at predetermined taps of the ladder resistors. These voltages are obtained by dividing a voltage ($V_{RT}-V_{RB}$) between the upper and lower reference voltages by the ladder resistors $R_1$ to $R_{256}$ of the A/D converter 4 ($V_{RB}<V_A<V_B<V_C<V_{RT}$).

Assume that an output signal level of the clamp circuit 2 falls within the range between the voltages $V_A$ and $V_B$.

In this case, since the transistors $Q_4$, $Q_7$, and $Q_9$ are turned on, and the transistors $Q_3$, $Q_6$, and $Q_{10}$ are turned off, the output video signal from the amplifier 1 is negatively fed back to the input terminal of the amplifier 1 through the clamp circuit 2, the transistor $Q_9$, and the resistor $R'_9$, thereby decreasing the gain of the amplifier 1. Similarly, when the output signal level of the clamp circuit 2 falls within the range between the voltages $V_{RB}$ and $V_A$, negative feedback is not performed. When the output signal level falls within the range between the voltages $V_B$ and $V_C$, a negative feedback loop is formed through the resistors $R'_7$ and $R'_9$. When the output signal level falls within the range between the voltages $V_C$ and $V_{RT}$, a negative feedback loop is formed through the resistors $R'_5$, $R'_7$, and $R'_9$. Therefore, the gain varies depending on the amplitude levels of the video signal. Therefore, by appropriately setting the resistances of the resistors $R'_2$, $R'_5$, $R'_7$, and $R'_9$, nonlinear processing such as correction and white compression processing shown in FIG. 5 can be performed by the regression approximation. Note that the buffer amplifiers constituted by a pair of the transistor $Q_5$ and the resistor $R'_{14}$, a pair of the transistor $Q_8$ and the resistor $R'_{16}$, and a pair of the transistor $Q_{11}$ and the resistor $R'_{18}$ receive the voltages $V_C$, $V_B$, and $V_A$ to bias the negative feedback amplifier 1 through the resistors $R'_6$, $R'_8$, and $R'_{10}$. This arrangement is adopted to compensate for DC bias conditions of the negative feedback amplifier 1 upon ON/OFF operation of the differential switch. Therefore, the resistances of the resistors $R'_5$, $R'_7$, and $R'_9$ are set to be equal to those of $R'_6$, $R'_8$, and $R'_{10}$, respectively.

The nonlinearly processed video signal is supplied to the A/D converter 4 and is converted from the analog signal to a digital signal by the ladder resistors $R_1$ to $R_{256}$, the comparators $C_1$ to $C_{255}$, and the encoder circuit 4'. The video signal is then output as a video signal.

The upper reference voltage for the A/D converter 4 is the above-mentioned gain control signal to perform, e.g., white balance processing. The gain control signal is used to variably control the reference voltages, thereby controlling the conversion gain of the A/D converter 4. Since the points of changes in nonlinear processing characteristics are set in accordance with tap potentials of the ladder resistors of the A/D converter 4, the points are changed in synchronism with the gain control signal. Therefore, the video signal prior to gain control can be optimally nonlinearly processed. In this case, the tap potentials of the ladder resistors are utilized. However, another voltage divider may be arranged to generate potentials of the points of changes by using the upper and lower reference voltages, thereby obtaining the same effect as described above. In this embodiment, three points of changes in nonlinear characteristics are used. However, various nonlinear characteristics may be realized, as a matter of course.

The A/D converter 4 comprises an 8-bit converter in this embodiment. However, the number of bits of the converter may be an arbitrary number.

As described above, the video signal having a large amplitude equal to the input level of the A/D converter 4 is compared with the high-precision potentials at the taps of the ladder resistors in the A/D converter 4 to operate the differential switch, thereby obtaining high-precision nonlinear characteristics.

Figure 2:
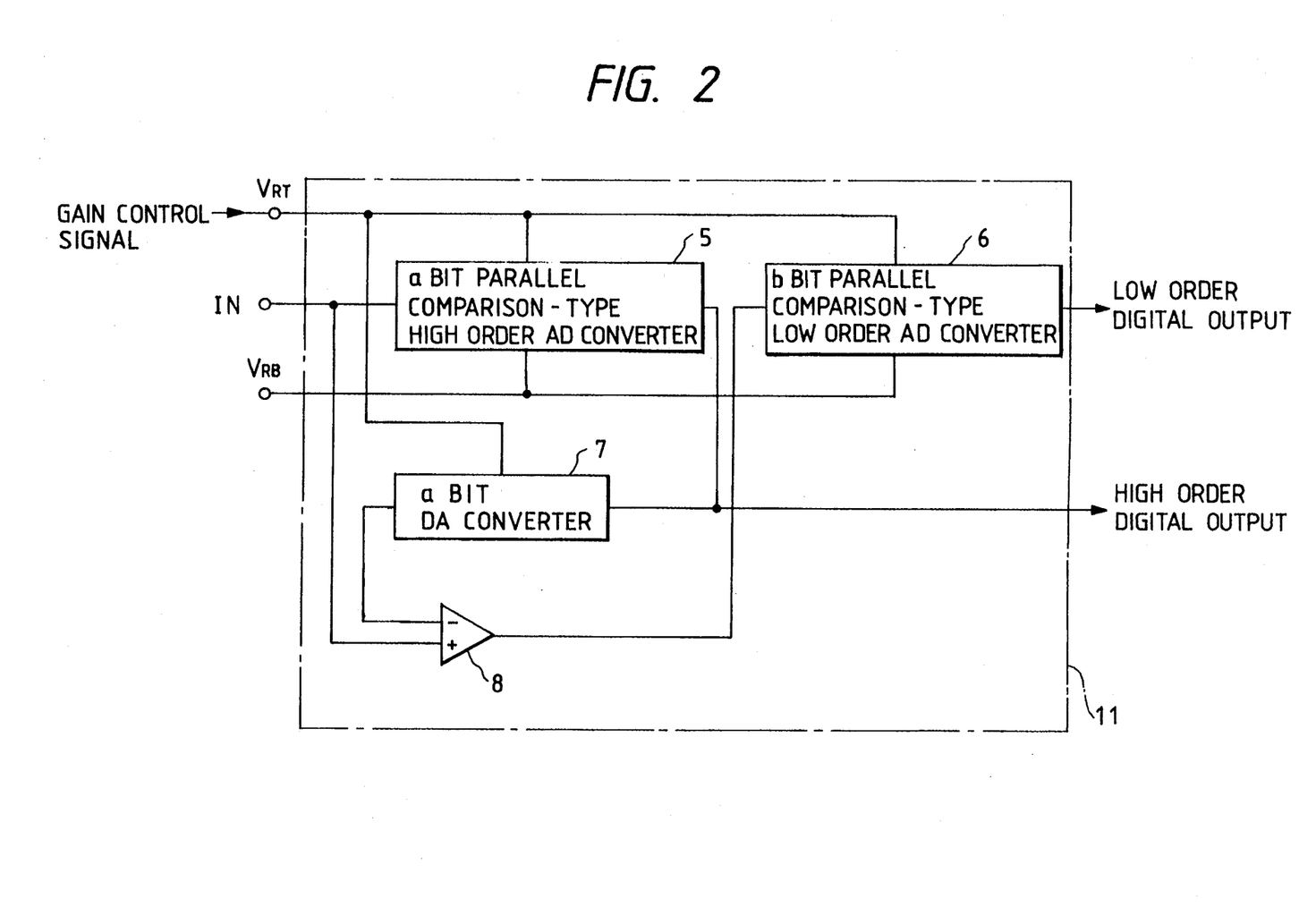
FIG. 2 is a block diagram showing the main part of the second embodiment according to the present invention.

FIG. 2 is a block diagram showing the main part of the second embodiment according to the present invention. This embodiment includes a typical serial/parallel A/D converter 11.

Figure 3:
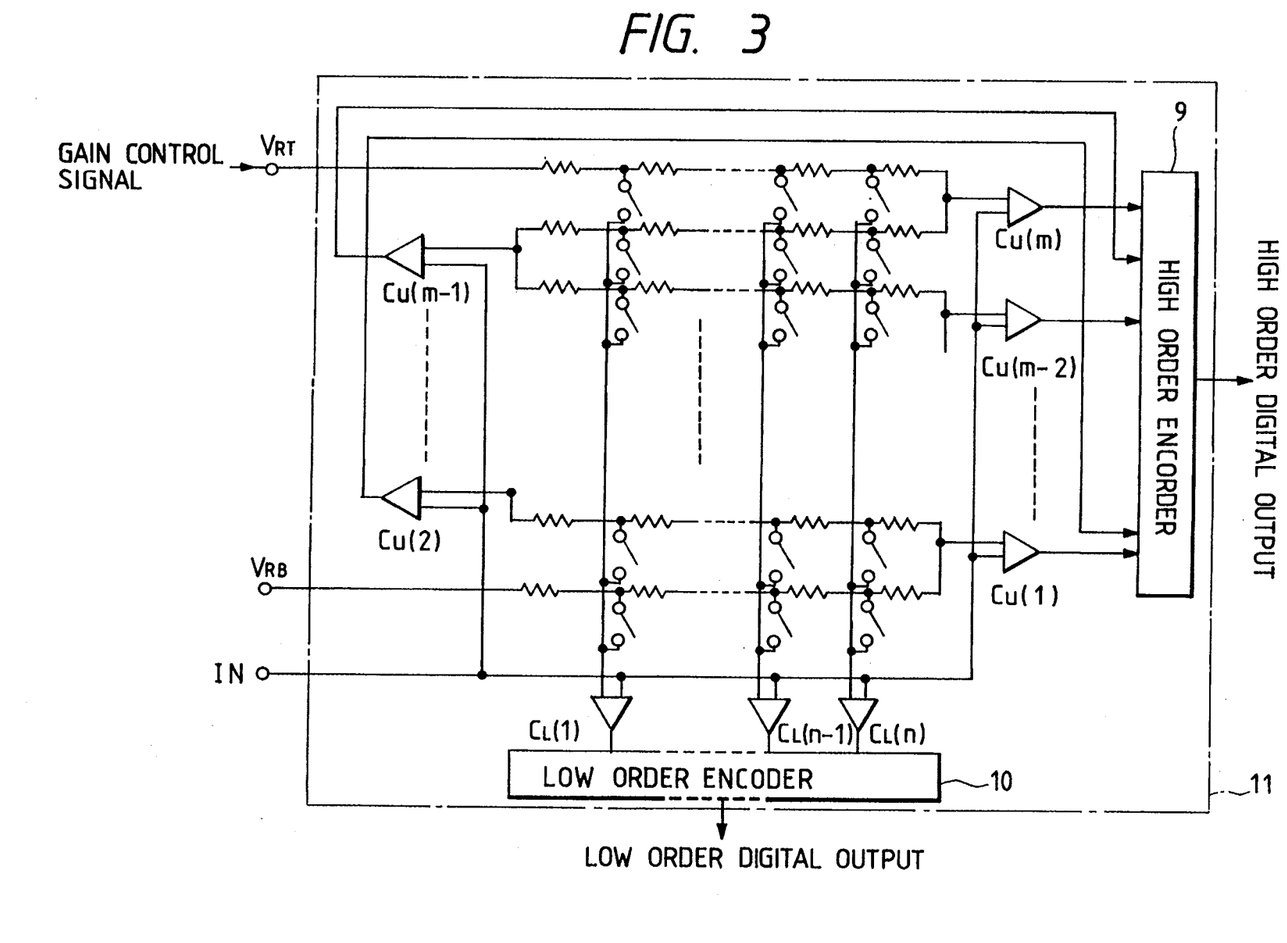
FIG. 3 is a circuit diagram showing the main part of the third embodiment according to the present invention.

In place of the parallel comparison type A/D converter in FIG. 1, the serial/parallel A/D converter is used in the second embodiment. More specifically, tap potentials of ladder resistors serving as constituting elements of an a bit parallel comparison-type high order AD converter 5 or a b bit parallel comparison-type low order AD converter 6 are used as reference voltages for the differential switch. Other arrangements of the second embodiment are the same as those of the first embodiment. FIG. 3 is a circuit diagram showing the main part of the third embodiment according to the present invention. Tap potentials of ladder resistors of a serial/parallel A/D converter different from that of the second embodiment are utilized in the third embodiment. As described above, when the parallel comparison-type A/D converter is replaced with the serial/parallel A/D converter, the size of the A/D converter can be greatly reduced, and hence the circuit size of the image pickup signal processing apparatus can be reduced.

According to the present invention, as has been described above, the following effects (a) to (e) are obtained.

(a) The points of changes in nonlinear characteristics are determined on the basis of the video signal having a relatively large amplitude equal to the input level of the A/D converter and the tap potentials of the ladder resistors of the A/D converter which have small relative variations. High-precision nonlinear characteristics can be obtained.

(b) Since the nonlinear characteristics are obtained by changing the negative feedback amount of the amplifier, a sufficiently wide dynamic range of the amplifier can be assured.

(c) When a wide-band, high-gain amplifier is used as the negative feedback amplifier 1, only one amplifier need be used, and the circuit arrangement can be simplified.

(d) When the reference voltage of the A/D converter is variably controlled and the A/D converter is utilized as a voltage-controlled amplifier, the nonlinear characteristics can be changed in synchronism with the reference voltages. Processing such as white balance processing can be performed in this arrangement.

(e) Since the apparatus is arranged on the basis of the upper and lower reference voltages of the A/D converter, matching in each signal processing can be improved.

What is claimed is:

1. An image pickup signal processing apparatus for performing nonlinear processing, comprising:
(a) an A/D converter for converting an analog image pickup signal to a digital image pickup signal on the basis of a reference voltage;
(b) a plurality of comparison means for comparing the analog image pickup signal to be input to said A/D converter with a plurality of voltages obtained by dividing said reference voltage; and
(c) nonlinear processing means for nonlinearly processing the analog image pickup signal, said nonlinear processing means having a processing characteristic which is changeable in accordance with the outputs of said plurality of comparison means, said nonlinear signal processing means including clamp means for fixing a black level of the analog image pickup signal output from said nonlinear processing means to a predetermined level.

2. An image pickup signal processing apparatus, comprising:
(a) an A/D converter for converting an analog image pickup signal into a digital pickup Signal on the basis of a reference voltage;
(b) voltage division means for providing a voltage divided from said reference voltage;
(c) comparison means for comparing the voltage provided by said voltage division means with the analog image pickup signal; and
(d) control means for controlling the level of the analog image pickup signal according to a result of the comparison performed by said comparison means, said control means selecting one of a plurality of different gains according to the result of the comparison performed by said comparison means, said control means including clamp means for fixing a black level of the analog image pickup signal output from said control means to a predetermined level.

3. An apparatus according to claim 2, wherein said clamp means in controlled by another reference voltage of said A/D converter.

4. An image pickup signal processing apparatus, comprising:
(a) an A/D converter for converting an analog image pickup signal into a digital pickup signal on the basis of a reference voltage;
(b) voltage division means for providing a voltage divided from said reference voltage;
(c) comparison means for comparing the voltage provided by said voltage division means with the analog image pickup signal; and
(d) control means for performing λ-correction of the analog image pickup signal to be compared and for controlling the level of the analog image pickup signal to be according to a result of the comparison performed by said comparison means, said control means selecting one of a plurality of different gains according to the result of the comparison performed by said comparison means.

5. An image pickup signal processing apparatus, comprising:
(a) an A/D converter for converting an analog image pickup signal into a digital pickup signal on the basis of a reference voltage;
(b) voltage division means for providing a voltage divided from said reference voltage;
(c) comparison means for comparing the voltage provided by said voltage division means with the analog image pickup signal; and
(d) control means for controlling the level of the analog image pickup signal according to a result of the comparison performed by said comparison means, said control means selecting one of a plurality of different gains according to the result of the comparison performed by said comparison means, wherein a white balance of the analog image pickup signal is adjusted by changing said reference voltage.

6. An image pickup signal processing apparatus, comprising:

(a) an A/D converter for converting an analog image pickup signal into a digital image pickup signal on the basis of a changeable reference voltage;

(b) comparison means for comparing said reference voltage with the analog image pickup signal; and (c) nonlinear signal processing means for nonlinearly processing the analog image pickup signal, said nonlinear signal processing means having processing characteristics which can be changed according to a result of the comparison performed by said comparison means, said nonlinear signal processing means including clamp means for fixing a black level of the analog image pickup signal output from said nonlinear signal processing means to a predetermined level.

7. An apparatus according to claim 6, wherein said clamp means is controlled by another reference voltage of said A/D converter.

8. An image pickup signal processing apparatus, comprising:

(a) an A/D converter for converting an analog image pickup signal into a digital image pickup signal on the basis of a reference voltage, said reference voltage being capable of being changed;

(b) comparison means for comparing said reference voltage with the analog image pickup signal; and (c) nonlinear signal processing means for performing λ-correction of the analog image pickup signal to be compared and for nonlinearly processing the analog image pickup signal to be compared, said nonlinear signal processing means having processing characteristics which can be changed in accordance with a result of the comparison performed by said comparison means.

9. An image picked signal processing apparatus, comprising:

(a) an A/D converter for converting an analog image pickup signal into a digital image pickup signal on the basis of a changeable reference voltage;

(b) comparison means for comparing said reference voltage with the analog image pickup signal; and (c) nonlinear signal processing means for nonlinearly processing the analog image pickup signal, said nonlinear signal processing means having processing characteristics which can be changed according to a result of the comparison performed by said comparison means, wherein said A/D converter adjusts white balance of the analog image pickup signal by changing the reference voltage.

10. An image pickup signal processing apparatus, comprising:

(a) an A/D converter for converting an analog image pickup signal into a digital image pickup signal, said A/D converter further comprising a ladder resistance;

(b) comparison means for comparing the analog image pickup signal with a tap voltage of said ladder resistance; and (c) control means for controlling the level of the analog image pickup signal according to a result of the comparison performed by said comparison means, said control means selecting one of a plurality of different gains according to the result of the comparison performed by said comparison means, said control means including clamp means for fixing a black level of the analog image pickup signal output from said control means to a predetermined level.

11. An apparatus according to claim 10, wherein said clamp means is controlled by another reference voltage of said A/D converter.

12. An image pickup signal processing apparatus, comprising:

(a) an A/D converter for converting an analog image pickup signal into a digital image pickup signal, said A/D converter further comprising a ladder resistance;

(b) comparison means for comparing the analog image pickup signal with a tap voltage of said ladder resistance; and (c) control means for performing λ-correction of the analog image pickup signal to be compared and for controlling the level of the analog image pickup signal to be compared according to a result of the comparison performed by said comparison means, said control means selecting one of a plurality of different gains according to the result of the comparison performed by said comparison means.

13. An image pickup signal processing apparatus, comprising:

(a) an A/D converter for converting an analog image pickup signal into a digital image pickup signal, said A/D converter further comprising a ladder resistance and a voltage-controlled amplifier for adjusting white balance of the analog image pickup signal;

(b) means for changing reference voltages at both sides of said ladder resistance of said A/D converter;

(c) comparison means for comparing the analog image pickup signal with a tap voltage of said ladder resistance; and (d) control means for controlling the level of the analog image pickup signal to be provided to said comparison means according to a result of the comparison performed by said comparison means, said control means selecting one of a plurality of different gains according to the result of the comparison performed by said comparison means.

14. An image pickup signal processing apparatus for performing nonlinear processing, comprising:

(a) an A/D converter for converting an analog image pickup signal to a digital image pickup signal on the basis of a reference voltage, said A/D converter including a plurality of comparators for comparing the analog image pickup signal with a plurality of voltages obtained by dividing said reference voltage;

(b) a plurality of comparison means for comparing the analog image pickup signal with a plurality of voltages obtained by dividing said reference voltage; and (c) nonlinear processing means for nonlinearly processing the analog image pickup signal to be compared, said nonlinear processing means having a processing characteristic which is changeable in accordance with the outputs of said plurality of comparison means.

15. An apparatus according to claim 14, wherein said nonlinear processing means includes:

a negative feedback amplifier; and means for changing a negative feedback amount of said negative feedback amplifier and for generating nonlinear characteristics.

16. An apparatus according to claim 14, further including means for changing said reference voltage.

17. An apparatus according to claim 14, wherein said A/D converter also serves as a voltage-controlled amplifier.

18. An image pickup signal processing apparatus for performing nonlinear processing, comprising:
 (a) an A/D converter for converting an analog image pickup signal into a digital image pickup signal on the basis of a changeable reference voltage, said A/D converter including a plurality of comparators for comparing the analog image pickup signal to be input to said A/D converter with a plurality of voltages obtained by dividing said reference voltage;
 (b) comparison means for comparing said reference voltage with the analog image pickup signal; and
 (c) nonlinear signal processing means for nonlinearly processing the analog image pickup signal to be provided to said comparison means, said non linear signal processing means having processing characteristics which can be changed according to a result of the comparison performed by said comparison means.

19. An apparatus according to claim 18, wherein said nonlinear signal processing means includes:
 a negative feedback amplifier; and
 means for changing a negative feedback amount of said negative feedback amplifier and for generating nonlinear characteristics.

20. A signal processing apparatus comprising:
 (a) voltage division means for providing a plurality of voltages divided from a reference voltage;
 (b) an A/D converter for A/D converting an analog signal to a digital signal by using all of the voltages provided by said voltage division means;
 (c) comparison means for comparing said analog signal with each of the voltages provided by said voltage division means; and
 (d) amplifying means for amplifying the analog signal to be compared, said amplifying means having an amplifying gain which is selected from among a plurality of gains in response to an output from said comparison means,
 wherein said amplifying means includes clamp means for fixing a black level of the analog signal output from said amplifying means to a predetermined level.

21. An apparatus according to claim 20, wherein said amplifying means includes:
 a negative feedback amplifier; and
 means for changing an amount of negative feedback provided by said negative feedback amplifier and for generating nonlinear characteristics.

22. An apparatus according to claim 20, wherein said clamp means is controlled by another reference voltage of said A/D converter.

* * * * *

UNITED STATES PATENT AND TRADEMARK OFFICE
CERTIFICATE OF CORRECTION

PATENT NO. : 5,426,461
DATED : June 20, 1995
INVENTOR(S) : Eiji Ohara

It is certified that error appears in the above-indentified patent and that said Letters Patent is hereby corrected as shown below:

On title page, item

[56] References Cited

United States Patent Documents, "Kacheran et al." should read --Kucheran et al.--.

COLUMN 1

Line 14, "$\lambda$-correction" should read --$\gamma$-correction--;

Line 63, "$R_{10}//R1_1 //R_{12})/(R_9 R_{10}//R_{11}//R_{12})$." should read --$(R_{10}//R1_1//R_{12})/(R_9 + R_{10}//R_{11}//R_{12})$.--; and Line 65, "$\lambda$-correc-" should read --$\gamma$-correc- --.

COLUMN 3

Line 32, "$\lambda$ correction" should read --$\gamma$ correction--.

COLUMN 4

Line 43, "a" should read --a digital--.

COLUMN 6

Line 9, "Signal" should read --signal--;

Line 27, "in" should read --is--;

Line 39, "$\lambda$-correction" should read --$\gamma$-correction--; and

Line 42, "be" should read --be compared--.

UNITED STATES PATENT AND TRADEMARK OFFICE
CERTIFICATE OF CORRECTION

PATENT NO. : 5,426,461
DATED : June 20, 1995
INVENTOR(S) : Eiji Ohara

It is certified that error appears in the above-indentified patent and that said Letters Patent is hereby corrected as shown below:

COLUMN 7

Line 28, "$\lambda$-correction" should read --$\gamma$-correction--; and

Line 35, "picked" should read --pickup--.

COLUMN 8

Line 15, "$\lambda$-correction" should read --$\gamma$-correction--.

COLUMN 9

Line 23, "non linear" should read --nonlinear--.

Signed and Sealed this

Seventh Day of November, 1995

Attest:

BRUCE LEHMAN

Attesting Officer

Commissioner of Patents and Trademarks